United States Patent
Hsu et al.

(10) Patent No.: US 10,840,660 B2
(45) Date of Patent: Nov. 17, 2020

(54) ELECTRONIC DEVICE AND ANTENNA CONNECTOR

(71) Applicant: GETAC TECHNOLOGY CORPORATION, Hsinchu County (TW)

(72) Inventors: Wan-Lin Hsu, Taipei (TW); Juei-Chi Chang, Taipei (TW); Kun-Cheng Lee, Taipei (TW)

(73) Assignee: Getac Technology Corporation, Hsinchu County (TW)

( * ) Notice: Subject to any disclaimer, the term of this patent is extended or adjusted under 35 U.S.C. 154(b) by 0 days.

(21) Appl. No.: 16/264,510

(22) Filed: Jan. 31, 2019

(65) Prior Publication Data

US 2020/0059054 A1    Feb. 20, 2020

Related U.S. Application Data (60) Provisional application No. 62/719,534, filed on Aug. 17, 2018.

(51) Int. Cl.
*H01R 33/975* (2006.01)
*G06F 1/16* (2006.01)
(Continued)

(52) U.S. Cl.
CPC ......... *H01R 33/975* (2013.01); *G06F 1/1632* (2013.01); *G06F 1/1654* (2013.01);
(Continued)

(58) Field of Classification Search
CPC .... H01R 13/2421; H01R 24/50; H01R 12/52; H01R 12/714; H01R 13/187; H01R 13/512; H01R 13/629; H01R 13/6315; H01R 13/6658; H01R 2103/00; H01R 24/38; H01R 24/40; H01R 9/0515; H01R 9/096; G06F 1/1632; G06F 1/1669; G06F 1/1654; G06F 1/1681; G06F 1/1626; G06F 1/1616; G06F 1/1628; G06F 1/1679; G06F 1/1601; G06F 1/1618; G06F 1/1624; G06F 1/1635; G06F 1/1667; G06F 1/1675;
(Continued)

(56) References Cited

U.S. PATENT DOCUMENTS

7,416,418 B2 *   8/2008   Berthet ................. H01R 24/50
                                                              439/66
9,130,328 B1 *   9/2015   Huang ............... H01R 13/2421
(Continued)

*Primary Examiner* — Edwin A. Leon
*Assistant Examiner* — Matthew T Dzierzynski (57) ABSTRACT

The present invention relates to an electronic device and an antenna connector. The electronic device includes a first unit, a transmission dock, a base, and an antenna connector. The transmission dock is pivotally provided at the first unit. The base is movably provided at the transmission dock, and includes a top plate and a bottom plate that are mutually fixed. The antenna connector is movably provided at the base, and includes a housing, an installation flange, a central moving terminal and an elastic member. The central moving terminal is located in the housing. The installation flange is radially formed outside the housing, and is located between the top plate and the bottom plate and abuts against the top plate. The elastic member is clamped between the installation flange and the bottom plate.

16 Claims, 8 Drawing Sheets

(51) Int. Cl.
*H01R 33/76* (2006.01)
*H01R 13/631* (2006.01)
*H01R 13/73* (2006.01)

(52) U.S. Cl.
CPC ....... *H01R 13/631* (2013.01); *H01R 33/7685* (2013.01); *H01R 13/73* (2013.01); *H01R 33/7671* (2013.01); *H01R 2201/06* (2013.01)

(58) Field of Classification Search
CPC .................. G06F 1/1683; G06F 1/263; G06F 2200/1614; G06F 2200/1633; G06F 3/0202
See application file for complete search history.

(56) References Cited

U.S. PATENT DOCUMENTS

| | | | |
|---|---|---|---|
| 9,543,629 B2 * | 1/2017 | Tong | H01R 13/5219 |
| 10,090,617 B2 * | 10/2018 | Nakatani | G06F 1/16 |
| 10,231,350 B2 * | 3/2019 | Katsuyama | G06F 1/1616 |
| 10,349,544 B2 * | 7/2019 | Katsuyama | G06F 1/1681 |
| 10,372,167 B1 * | 8/2019 | Hsu | G06F 1/1656 |
| 10,437,291 B2 * | 10/2019 | Hsu | G06F 1/1654 |
| 10,452,107 B2 * | 10/2019 | Katsuyama | G06F 1/1656 |
| 10,505,293 B2 * | 12/2019 | Wagner | H01R 24/50 |

* cited by examiner

ELECTRONIC DEVICE AND ANTENNA CONNECTOR

CROSS-REFERENCE TO RELATED APPLICATIONS

The present application claims the benefit of U.S. provisional Patent Application No. 62/719,534, filed on Aug. 16, 2018, the disclosure of which is hereby incorporated by reference herein in its entirety.

BACKGROUND OF THE INVENTION

Field of the Invention

The present invention relates to an electronic device and, more particularly, to an electronic device and an antenna connector applied to an electronic device.

Description of the Prior Art

There is currently an electronic device including a host and a transmission dock. The host can be separate from the transmission dock and is capable of operating independently. The host can be removed from the transmission dock when a user needs to carry the host to a different location, or can be plugged into the transmission dock when the user does not need to relocate the host. When the host is connected to the transmission dock, the host can be charged or perform more functions through the transmission dock.

When the host and the transmission dock are mutually connected, signal and power transmission is needed therebetween. To achieve the above object, each of the host and the transmission dock has a transmission interface, with the transmission interface of the host corresponding to the transmission interface of the transmission dock. Thus, when the host is plugged into transmission dock, the transmission interface of the host is connected to the transmission interface of the transmission dock. In general, a wired connection is adopted between the host and the transmission dock so as to ensure the stability and high efficiency of the signal and power transmission. For example, the transmission interface of the host includes a terminal socket and the transmission interface of the transmission dock includes a terminal plug, wherein the terminal plug can be plugged into the terminal socket, and a terminal in the terminal plug can come into contact with a terminal in the terminal socket to form a wired connection.

SUMMARY OF THE INVENTION

In the prior art, tolerances to certain extents exist in components in a host and a transmission dock of an electronic device as well as the assembly of these components, and the connection of the host and the transmission dock also contains a tolerance. These tolerances may stack up in a way that a terminal of the host and a terminal of the transmission dock cannot be accurately aligned and reliably connected. Or, if the electronic device encounters vibration or swaying, the terminals that are in mutual contact are easily disengaged from each other due to the vibration or swaying, leading to the interruption of signal or power transmission. Even if the connection relationship can be restored after momentary disengagement and after eliminating the external force, such brief signal interruption can still severely affect the efficiency and accuracy of overall computation in a utilization environment demanding a high speed and high accuracy.

In view of the above, the present invention provides an electronic device and an antenna connector targeting at reinforcing connection stability, eliminating influences of tolerances, and preventing the interruption caused by vibration or swaying.

In an embodiment of the present invention, an antenna connector adapted to be installed to a base is provided. The antenna connector includes a housing, a central moving terminal, a peripheral contact, an insulation body and an elastic member. An installation flange is radially formed at the housing, and the antenna connector is installed to the base through the installation flange. The central moving terminal is axially and displaceably provided in the housing. The peripheral contact is axially and displaceably provided between the housing and the central moving terminal. The insulation body is provided between the central moving terminal and the peripheral contact. The elastic member is located below the installation flange, and is clamped between the base and the installation flange.

In an embodiment of the present invention, an electronic device includes a first unit, a transmission dock, a base and an antenna connector. The transmission dock is pivotally provided at the first unit. The base is movably provided at the transmission dock, and includes a top plate and a bottom plate, wherein the top plate and the bottom plate are mutually fixed. The antenna connector is movably provided at the base, and includes a housing, an installation flange, a central moving terminal, and an elastic member. The central moving terminal is located in the housing. The installation flange is radially formed outside the housing, and is located between the top plate and the bottom plate and abuts against the top plate. The elastic member is clamped between the installation flange and the bottom plate.

In conclusion, the electronic device and the antenna connector according to the embodiments of the present invention are capable of facilitating mutual positioning of corresponding transmission interfaces when the transmission interfaces are connected, as well as reinforcing connection stability. Thus, not only tolerances of components and the assembly of the components can be counterbalanced through a structural design to further eliminate the influences of tolerances, but also stress generated from vibration or swaying can be absorbed to maintain a constant connection relationship between the transmission interfaces, preventing the interruption caused by vibration or swaying.

Detailed features and advantages of the present invention are recited in the Detailed Description of the Embodiments below. The disclosure is sufficient for a person skilled in the art to understand and accordingly implement the contents of the present invention. Moreover, on the basis of the description, claims and drawings disclosed in the application, a person skilled in the art can easily understand the objects and advantages related to the present invention.

DETAILED DESCRIPTION OF THE EMBODIMENTS

Figure 1:
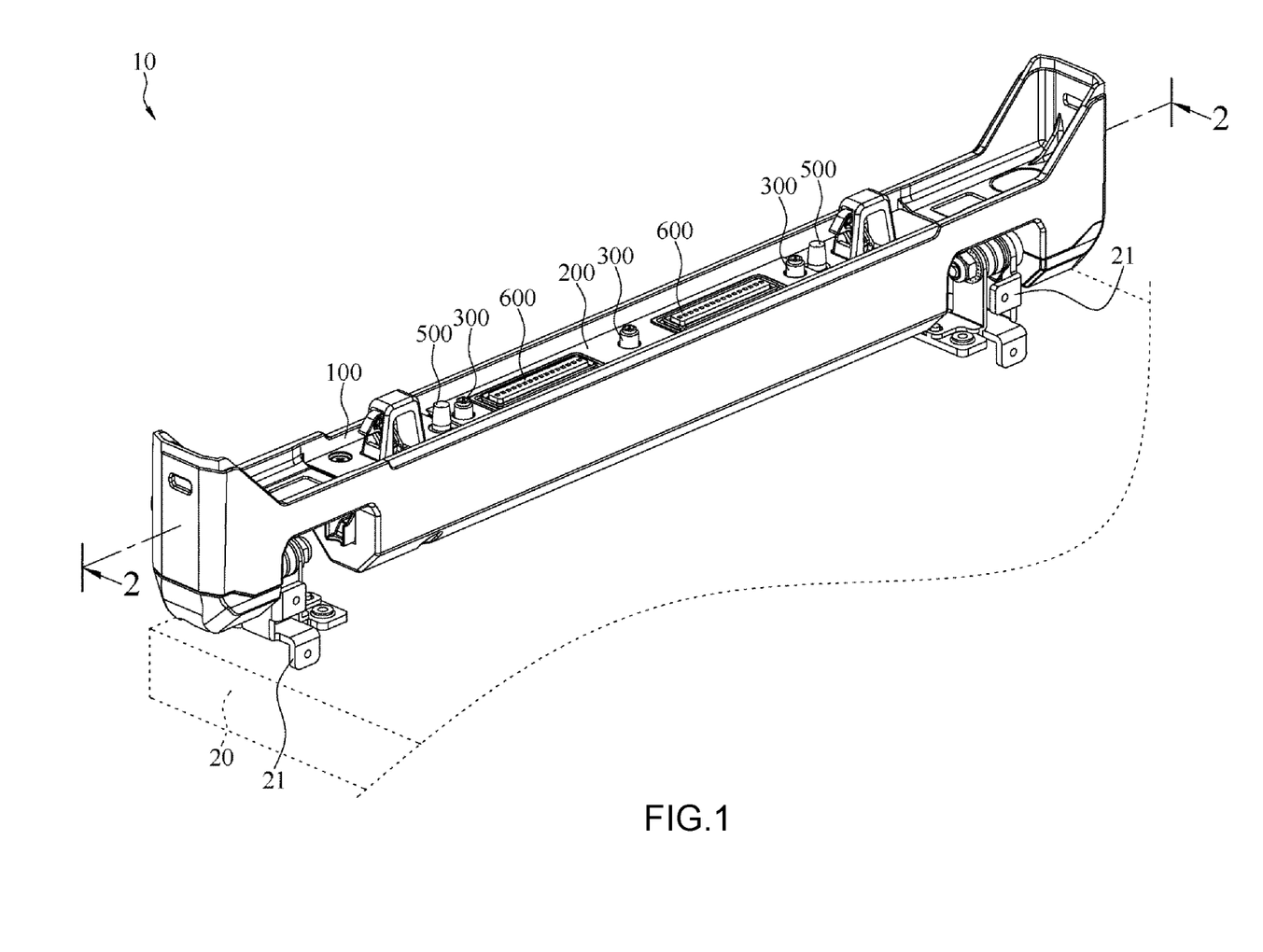
FIG. 1 is a schematic diagram of an electronic device according to an embodiment of the present invention.
Figure 8:
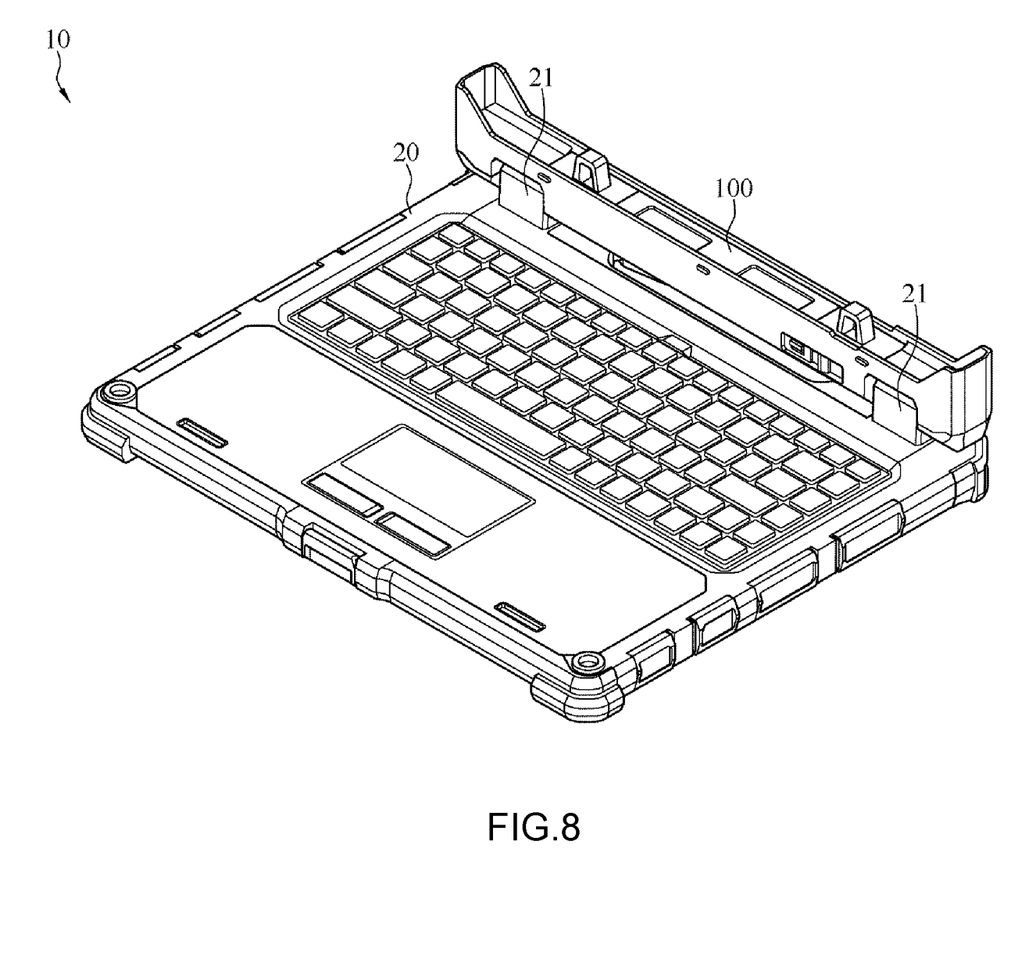
FIG. 8 is a schematic diagram of an implementation of the electronic device in FIG. 1.

Referring to FIG. 1 and FIG. 8, FIG. 1 shows a schematic diagram of an electronic device 10 according to an embodiment of the present invention, and FIG. 8 shows a schematic diagram of an implementation of the electronic device 10 in FIG. 1. In this embodiment, the electronic device 10 includes a first unit 20, a transmission dock 100, a base 200 and an antenna connector 300. The first unit 20 is connected to the transmission dock 100. As shown in FIG. 8, the first unit 20 is, for example but not limited to, a plate-like device having components such as a keyboard or a battery. As shown in FIG. 1 and FIG. 8, in this embodiment, the transmission dock 100 includes a pivot shaft assembly 21 through which the transmission dock 100 can be pivotally provided at the first unit 20 and thus can rotate relative to the first unit 20. The base 200 is movably provided at the transmission dock 100, and the antenna connector 300 is movably provided at the base 200. In other words, the base 200 has a certain level of mobility relative to the transmission dock 100, and the antenna connector 300 similarly has a certain level of mobility relative to the base 200. Such configuration can also be interpreted as that the base 200 is floatable relative to the transmission dock 100, and the antenna connector 300 is floatable relative to the base 200. The floatable base 200 and antenna connector 300 can counterbalance tolerances of the components and the assembly of the components, as well as the connection tolerance of the antenna connector 300 and the corresponding docking connector, and are capable of preventing any interruption caused by vibration or swaying. In this embodiment, the antenna connector 300 is, for example but not limited to, transmitting signals transmitted and received by an antenna.

Figure 2:
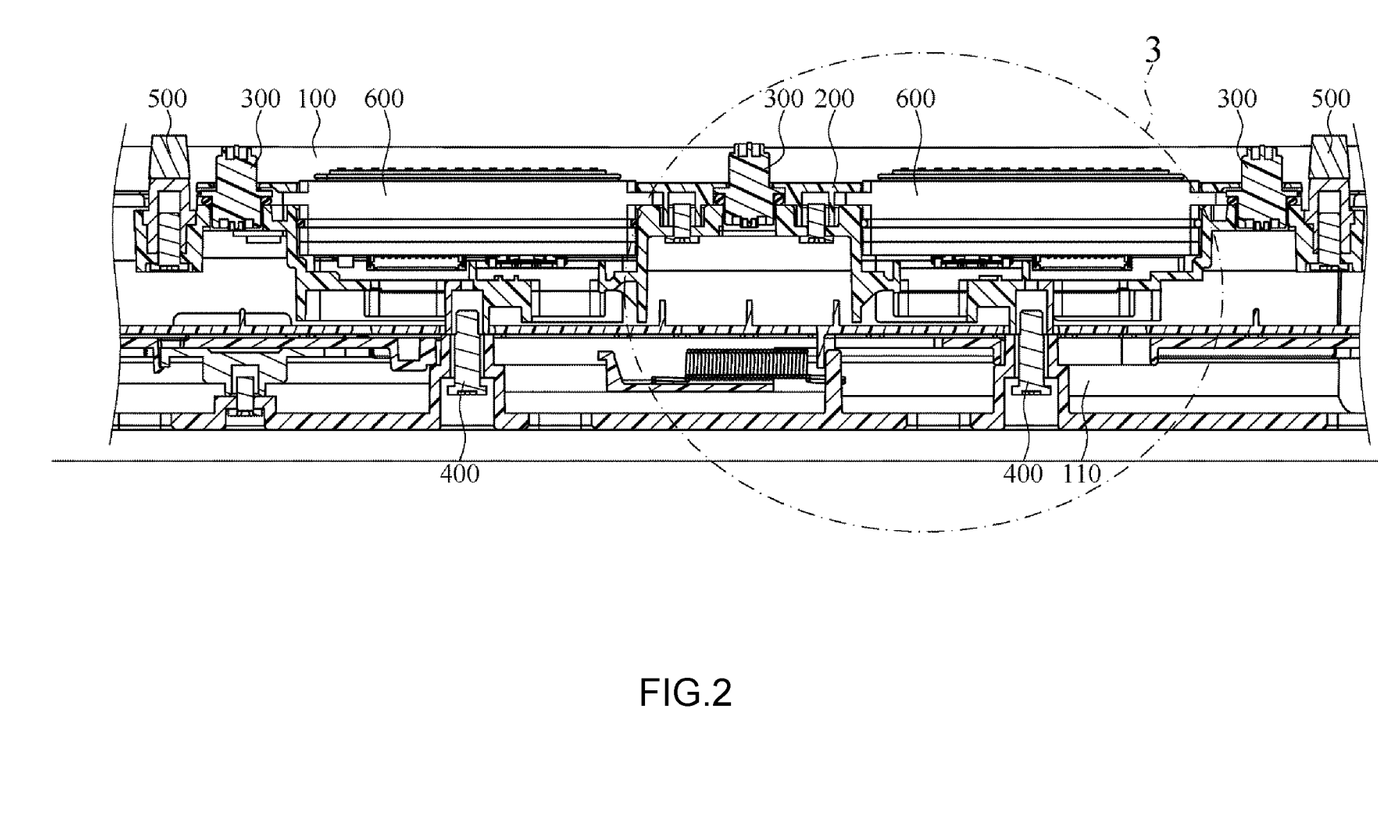
FIG. 2 is a sectional diagram of FIG. 1 along a section line 2-2.
Figure 3:
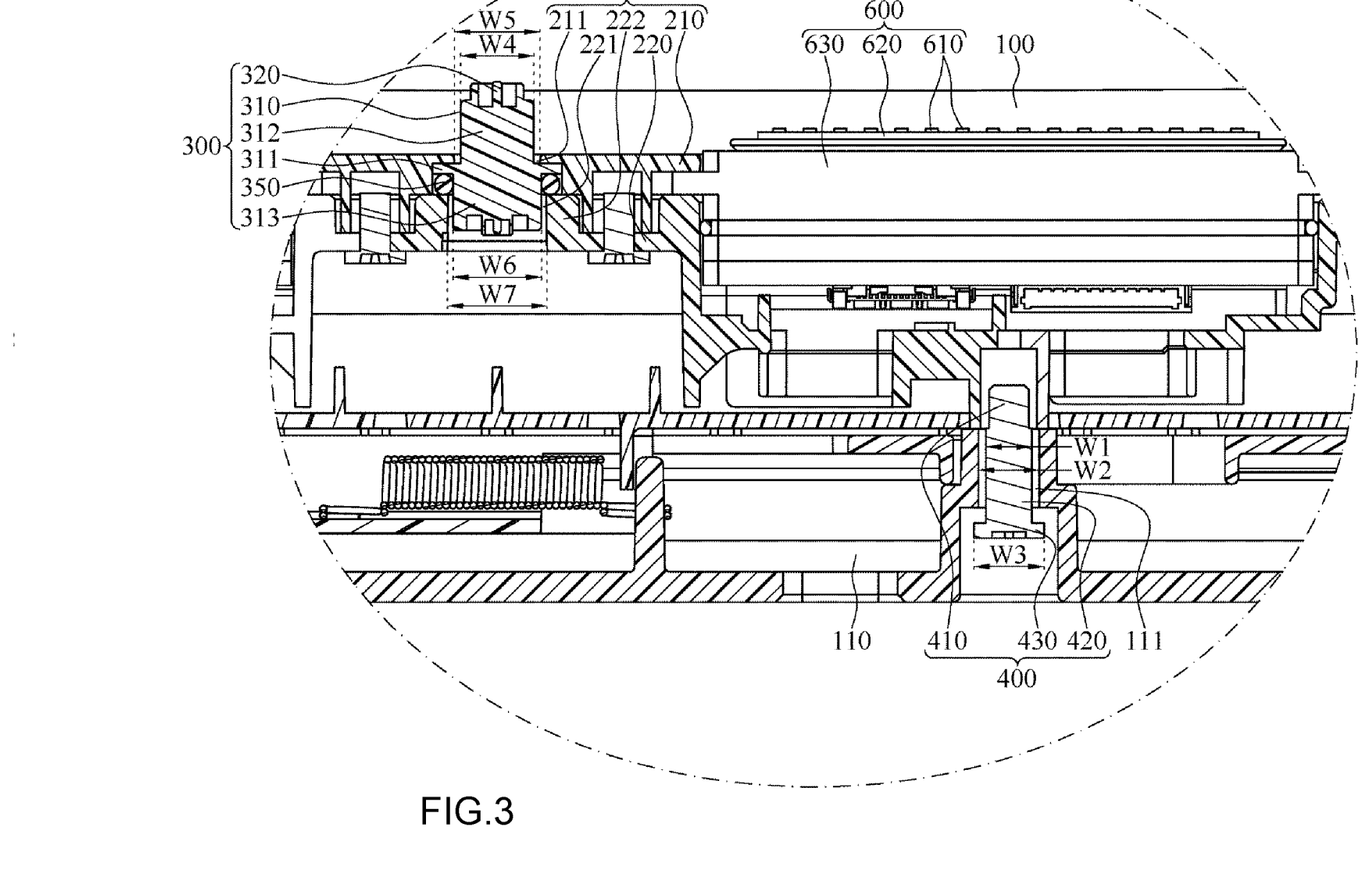
FIG. 3 is a partial enlarged diagram of a circled part in FIG. 2.

Referring to FIG. 2 and FIG. 3, FIG. 2 is a sectional diagram of FIG. 1 along a section line 2-2, and FIG. 3 is a partial enlarged diagram of a circled part in FIG. 2. As shown in FIG. 2 and FIG. 3, in this embodiment, the base 200 includes a top plate 210 and a bottom plate 220, and the top plate 210 and the bottom plate 220 are mutually fixed. As shown in FIG. 3, the antenna connector 300 includes a housing 310, an installation flange 311, a central moving terminal 320 and an elastic member 350. The central moving terminal 320 is located in the housing 310, and is aligned with a center axis of the housing 310. The installation flange 311 is radially formed outside the housing 310; that is, the installation flange 311 radially protrudes outwards from the housing 310. Furthermore, the installation flange 311 is located between the top plate 210 and the bottom plate 220, and has one side abutting against the top plate 210, while the elastic member 350 is clamped between the other side of the installation flange 310 and the bottom plate 220. In this embodiment, the elastic member 350 is a ring object made of rubber or other elastic materials, and is sleeved around the housing 310. When the antenna connector 300 receives an impact, the elastic member 350 can absorb stress generated from vibration or swaying, and the elastic restoring force of the elastic member 350 can keep the installation flange 311 persistently abutting against the top plate 210. With the deformation capability (the ability of being flattened and restoring to an original shape) of the elastic member 350, the antenna connector 300 has a certain level of displaceability in the axial direction thereof through the elastic member 350; in other words, the antenna connector 300 has limited mobility along the axial direction relative to the transmission dock 100.

As shown in FIG. 2 and FIG. 3, in this embodiment, the electronic device 10 further includes a fixing member 400. As shown in FIG. 3, the fixing member 400 includes a locking portion 410, a neck portion 420 and a step portion 430 that are arranged along an axial direction, and the neck portion 420 is located between the locking portion 410 and the step portion 430. Furthermore, the transmission dock 100 includes a base plate 110, the neck portion 420 of the fixing member 400 penetrates through the base plate 110, and the locking portion 410 is fixed at the base 200. For example, the locking portion 410 is provided with an outer thread, the bottom plate 220 of the base 200 has a locking hole (not shown), and an inner thread is provided in the locking hole. Thus, the locking portion 410 can be screwed to the locking hole to fix the fixing member 400 at the bottom plate 220.

As shown in FIG. 3, in this embodiment, the base plate 110 includes a base plate limiting hole 111, the neck portion 420 of the fixing member 400 penetrates through the base plate limiting hole 111, and the radial size of the neck portion 420 of the fixing member 400 is smaller than the radial size of the base plate limiting hole 111. For example, the radial size of the neck portion 420 is a width W1, the radial size of the base plate limiting hole 111 is a width W2, and the width W1 is smaller than the width W2. Furthermore, the radial size of the step portion 430 is greater than the radial size of the base plate limiting hole 111. For example, the radial size of the step portion 430 is a width W3, and the width W3 is greater than the width W2. Thus, the base plate 110 is clamped between the step portion 430 and the bottom plate 220. Furthermore, in the horizontal direction perpendicular to the axial direction of the fixing member 400, the neck portion 420 has a certain level of displaceability in the base plate limiting hole 111, and the neck portion 420 drives the bottom plate 220 to move when moving in the horizontal direction relative to the base plate 110, such that the bottom plate 220 similarly has a certain level of displaceability in the horizontal direction relative to the base plate 110. In other words, the base 200 and the antenna connector 330 also have a certain level of horizontal displaceability relative to the transmission dock 100.

As shown in FIG. 1 and FIG. 2, in this embodiment, the electronic device 10 further includes a positioning column 500, and the positioning column 500 is fixed at the base 200. The fixing column 500 helps the positioning of the transmission dock 100 with a corresponding transmission interface during a connecting process, with associated details to be described shortly.

As shown in FIG. 3, in this embodiment, the top plate 210 includes a top plate limiting hole 211, the housing 310 includes a connector stem 312, the connector stem 312 penetrates through the top plate limiting hole 211, and the radial size of the connector stem 312 is smaller than the radial size of the top plate limiting hole 211. For example, the radial size of the connector stem 312 is a width W4, the radial size of the top plate limiting hole 211 is a width W5, and the width W4 is smaller than the width W5. Thus, the connector stem 312 has a certain level of horizontal displaceability in the top plate limiting hole 211. Furthermore, the bottom plate 220 has a bottom plate limiting hole 221, and the bottom plate limiting hole 221 is axially aligned with the top plate limiting hole 211. The housing 310 further includes a connector root 313, the connector root 313 extends and penetrates through the bottom plate limiting hole 221, and the radial size of the connector root 313 is smaller than the radial size of the bottom plate limiting hole 221. For example, the radial size of the connector root 313 is a width W6, the radial size of the bottom plate limiting hole 221 is a width W7, and the width W6 is smaller than the width W7. Thus, the connector root 313 has a certain level of horizontal displaceability in the bottom plate limiting hole 221. It is known from the above that, in the horizontal direction, a certain margin exists between the connector stem 312 and the top plate limiting hole 211, a corresponding margin also exists between the connector root 313 and the bottom plate limiting hole 221. As such, the antenna connector 300 has a certain level of horizontal displaceability relative to the base 200.

As shown in FIG. 3, in this embodiment, the installation flange 311 is located between the connector stem 312 and the connector root 313 and surrounds the housing 310. The bottom plate 220 further includes a protruding column 222, the protruding column 222 is protrudingly provided at the bottom plate 220 and is located between the top plate 210 and the bottom plate 220, and the bottom plate limiting hole 221 is located in the protruding column 222. The elastic member 350 is clamped between the installation flange 311 and the protruding column 222, and surrounds and is in contact with the connector root 313.

The antenna connector 300 has a certain level of displaceability in both the axial direction and the horizontal direction relative to the base 200, and the base 200 has a certain level of displaceability in the horizontal direction relative to the transmission dock 100. That is to say, the antenna connector 300 not only has axial displaceability, but also has dual horizontal displaceability relative to the transmission dock 100. Thus, the robustness of the antenna connector 300 for counterbalancing tolerances and tolerating vibration or swaying is further reinforced. In this embodiment, the antenna connector 300 is, for example but not limited to, in a quantity of three, and these three antenna connectors 300 respectively handle signal transmission from different antennas.

As shown in FIG. 1 to FIG. 3, in this embodiment, the electronic device 10 further includes a signal connector 600, and the signal connector 600 can be used for transmitting power or signals other than antenna signals. As shown in FIG. 3, the signal connector 600 includes a signal terminal 610, a connector platform 620, and a frame 630. The signal terminal 610 is in a plural quantity, and the plurality of signal terminals 610 is arranged at the connector platform 620. The connector platform 620 is movably provided at the frame 630, and the frame 630 is fixed at the base 200. For example, an elastic ring may be clamped between the connector platform 620 and the frame 630, such that the connector platform 620 has a certain level of axial displaceability relative to the frame 630 through the deformation of the elastic ring. Please refer to the above description associated with the antenna connector 300 and elastic member 350 for details of the displacement of the connector platform 620 through the elastic ring, and aforesaid details are omitted herein. In this embodiment, the signal connector 600 is in a quantity of two, for example but not limited to.

Figure 4:
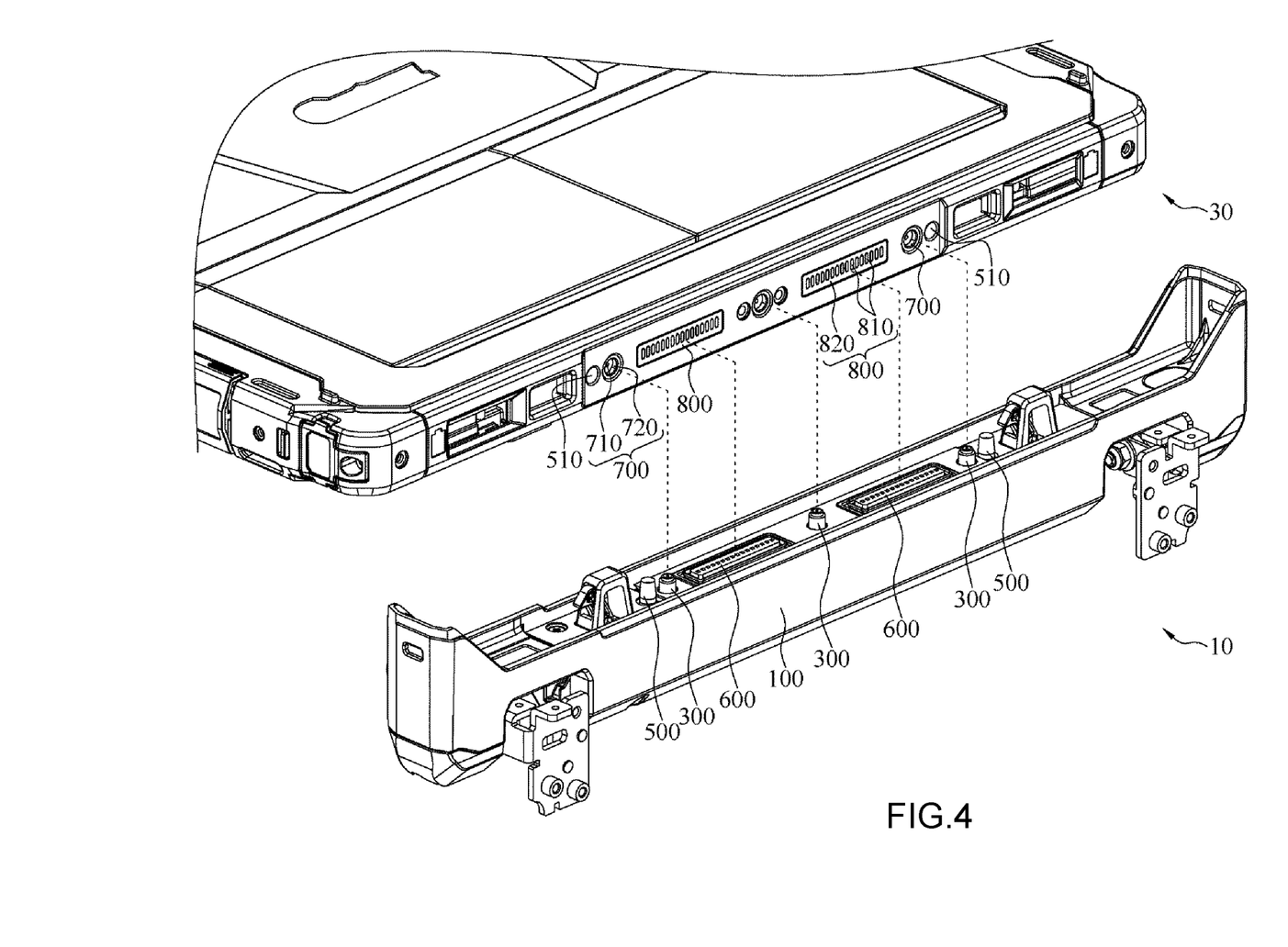
FIG. 4 is a schematic diagram of an electronic device according to another embodiment of the present invention.

FIG. 4 shows a schematic diagram of the electronic device 10 according to another embodiment of the present invention. Referring to FIG. 4, in this embodiment, the electronic device 10 further includes a second unit 30. The second unit 30 is, for example but not limited to, a tablet computer including a touch screen and a control module. The first unit 20 and the second unit 30 can be electrically connected to each other through the transmission dock 100. The second unit 30 includes a first docking connector 700 and a second docking connector 800, wherein the first docking connector 700 corresponds to the antenna connector 300, and the second docking connector 800 corresponds to the signal connector 600. The first docking connector 700 includes a first docking terminal 710 and a docking hole 720, wherein the first docking terminal 710 is located in the docking hole 720. The second docking connector 800 includes a second docking terminal 810 and a docking platform 820. The second docking terminal 810 is in a plural quantity, and the plurality of second docking terminals 810 is arranged at the docking platform 820. The second unit 30 is detachably connected to the transmission dock 100, the first docking connector 700 is detachably connected to the antenna connector 300, and the second docking connector 800 is detachably connected to the signal connector 600. When the second unit 30 is plugged into the transmission dock 100, the connector stem 312 of the antenna connector 300 enters the docking hole 720 of the first docking connector 700, the central moving terminal 320 comes into contact with the first docking terminal 710, the connector platform 620 of the signal connector 600 aligns and comes into contact with the docking platform 820 of the second docking connector 800, and the signal terminals 610 come into contact with the second docking terminals 810.

As shown in FIG. 4, in this embodiment, the second unit 30 further includes a positioning hole 510, and the positioning hole 510 corresponds to the positioning column 500. In this embodiment, the positioning column 500 is in a quantity of two, and the positioning hole 510 is in a quantity of two. When a user wishes to plug the second unit 30 into the transmission dock 100, the positioning holes 510 are aligned with the positioning columns 500 to have the positioning columns 500 enter the positioning holes 510. Since the positioning columns 500 match with the positioning holes 510, and when the two are matched, the second unit 30 is limited to approach the transmission dock 100 along the axial direction only. Furthermore, during the process that the second unit 30 approaches the transmission dock 100, the first docking connector 700 is axially aligned with the antenna connector 300, and the second docking connector 800 is axially aligned with the signal connector 600, thereby achieving a positioning effect.

Figure 5:
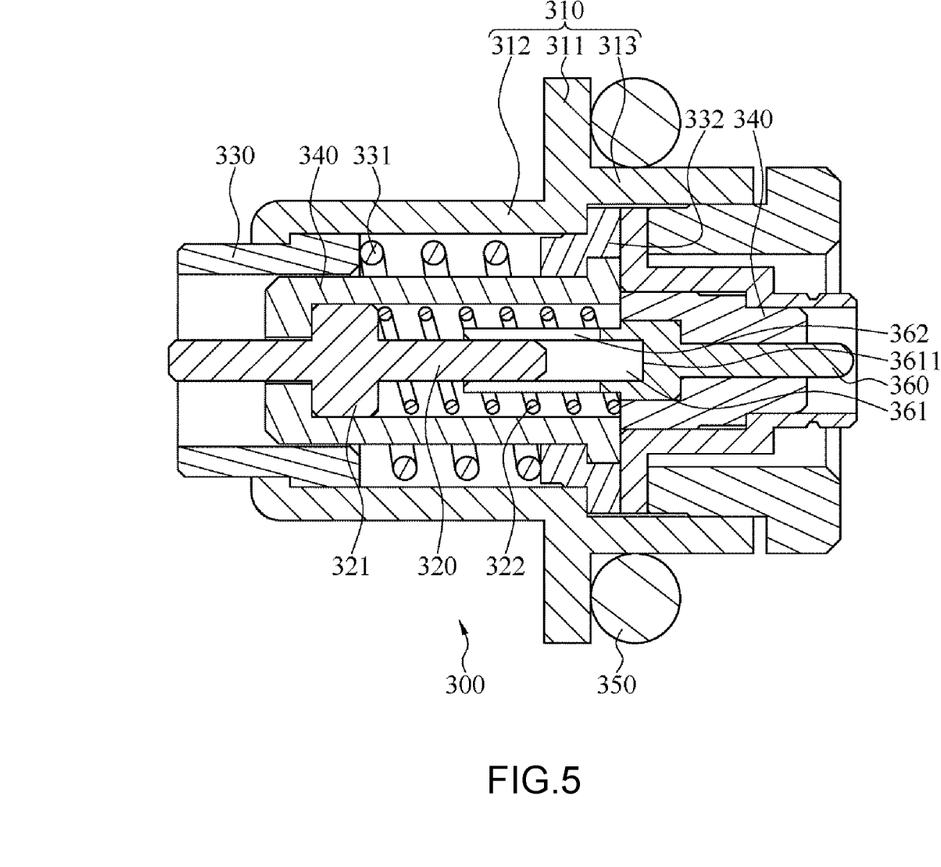
FIG. 5 is a sectional diagram of an antenna connector according to an embodiment of the present invention.

Referring to FIG. 5, FIG. 5 shows a sectional diagram of the antenna connector 300 according to an embodiment of the present invention to illustrate structural details of the antenna connector 300. As shown in FIG. 5, in this embodiment, the antenna connector 300 is adapted to be installed to, for example but not limited to, the base 200 in FIG. 1 to FIG. 4. The antenna connector 300 includes the housing 310, the central moving terminal 320, the peripheral contact 330, the insulation body 340 and the elastic member 350. The installation flange 311 is radially formed at the housing 310, and the antenna connector 300 can be installed to the base 200 through the installation flange 311. The central moving terminal 320 can be axially and displaceably provided in the housing 310. The peripheral contact 330 can be axially and displaceably provided between the housing 310 and the central moving terminal 320. The insulation body 340 is provided between the central moving terminal 320 and the peripheral contact 330. The elastic member 350 is located below the installation flange 311, and is clamped between the base 200 and the installation flange 311. For example, as shown in FIG. 3, one side of the installation flange 311 abuts against the top plate 210 of the base 200, and the elastic member 350 is located between the other side of the installation flange 311 and the bottom plate 220 of the base 200.

As shown in FIG. 5, in this embodiment, the housing 310 includes the connector stem 312 and the connector root 313, wherein the connector root 313 is located on one axial end side, and the connector stem 312 is located on the other axial end side. The installation flange 311 is located between the connector root 313 and the connector stem 312, and the elastic member 350 surrounds the connector root 313. The central moving terminal 320 is provided on the center axis of the connector stem 312, and the insulation body 340 is provided between the connector stem 312 and the central moving terminal 320. Furthermore, in this embodiment, the antenna connector 300 further includes a central fixed terminal 360. The central fixed terminal 360 is provided in the insulation body 340 and is axially aligned with the central moving terminal 320. In addition, the central fixed terminal 360 includes a connection hole 361 in which one end of the central moving terminal 320 can be axially and displaceably provided. One end of the central fixed terminal 360 away from the connection hole 361 is for connecting to a back-end antenna signal processing module (not shown).

As shown in FIG. 5, in this embodiment, the central fixed terminal 360 further includes multiple slits 362. The slits 362 extend axially, and are provided at intervals around the connection hole 361. The axial length of the slits 362 is greater than a half of the axial depth of the connection hole 361. The connection hole 361 and the central moving terminal 320 are designed to be closely in contact with each other. When the central moving terminal 320 is pressed and moves to a deeper part of the connection hole 361, the wall of the connection hole 361 can be slightly expanded through the slits 362, so as to reduce the frictional force between the central moving terminal 320 and the connection hole 361, which facilitates the central moving terminal 320 to move in the connection hole 361.

As shown in FIG. 5, in this embodiment, a moving terminal flange 321 is radially formed at the central moving terminal 320, and an inner spring 322 is provided between the moving terminal flange 321 and the insulation body 340 surrounding the central fixed terminal 360. When the central moving terminal 320 is pressed and moves to a deeper part of the connection hole 361, the inner spring 322 is correspondingly pressed by the moving terminal flange 321 and the insulation body 340, the elastic restoring force of the inner spring 322 is applied on the moving terminal flange 321, and forces the central moving terminal 320 to continually apply a forward pressure on the docking terminal. When the central moving terminal 320 is no longer pressed, the elastic restoring force of the inner spring 322 causes the central moving terminal 320 to return to an original position before being pressed. Furthermore, in this embodiment, since the depth of the connection hole 361 is greater than that of the central moving terminal 320, when the moving terminal flange 321 comes into contact with the central fixed terminal 360, the central moving terminal 320 does not come into contact with a hole bottom 3611 of the connection hole 361.

As shown in FIG. 5, in this embodiment, an outer spring 331 and a sealing member 332 are further provided between the housing 310 and the insulation body 340. Two end sides of the outer spring 331 respectively abut against the peripheral contact 330 and the sealing member 332. When the antenna connector 300 is connected to the corresponding docking connector, the peripheral contact 330 and the central moving terminal 320 are simultaneously pressed, the peripheral contact 330 enters between the insulation body 340 and the housing 310 when being pressed, and the peripheral contact 330 compresses the outer spring 331. When the peripheral contact 330 is no longer pressed, the elastic restoring force of the outer spring 331 causes the peripheral contact 330 to return to an initial position before being pressed.

Figure 6:
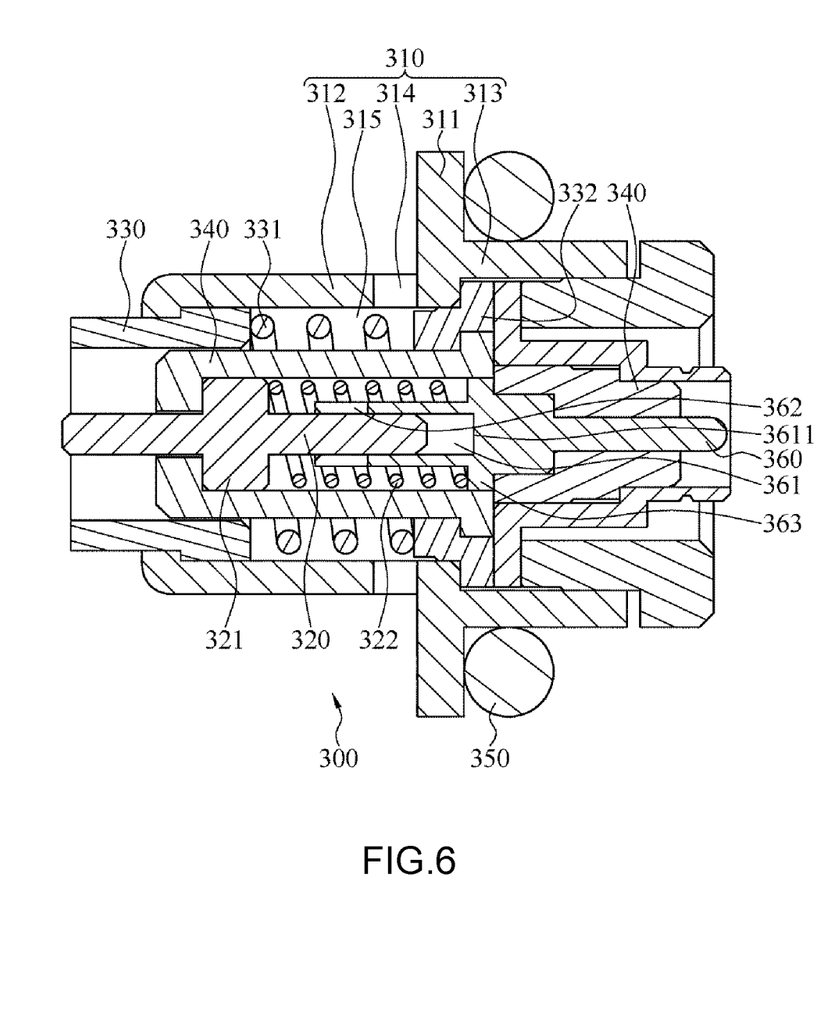
FIG. 6 is a sectional diagram of an antenna connector according to another embodiment of the present invention.

Referring to FIG. 6, FIG. 6 shows a sectional diagram of the antenna connector 300 according to another embodiment of the present invention. Some components of the antenna connectors 300 in FIG. 5 and FIG. 6 and the connection relationships thereof are similar or identical, and main differences between the antenna connectors 300 in FIG. 5 and FIG. 6 are described in detail below. As shown in FIG. 6, in this embodiment, the antenna connector 300 is adapted to be installed to, for example but not limited to, the base 200 shown in FIG. 1 to FIG. 4. The antenna connector 300 includes the housing 310, the central moving terminal 320, the peripheral contact 330, the insulation body 340, the elastic member 350 and the central fixed terminal 360. The housing 310 includes the connector stem 312 and the connector root 313. The installation flange 311 is located between the connector stem 312 and the connector root 313, and radially protrudes outwards from the housing 310. The antenna connector 300 can be installed to the base 200 through the installation flange 311. The central moving terminal 320 can be axially and displaceably provided in the housing 310. The peripheral contact 330 can be axially and displaceably provided between the housing 310 and the central moving terminal 320. The insulation body 340 is provided between the central moving terminal 320 and the peripheral contact 330. The elastic member 350 surrounds the connector root 313 and is clamped between the base 200 and the installation flange 311. For example, as shown in FIG. 3, one side of the installation flange 311 abuts against the top plate 210 of the base 200, and the elastic member 350 is located between the other side of the installation flange 311 and the bottom plate 220 of the base 200.

As shown in FIG. 6, in this embodiment, the central moving terminal 320 is provided on the center axis of the connector stem 312, and the central fixed terminal 360 is axially aligned with the central moving terminal 320. The insulation body 340 is provided between the housing 310, the central moving terminal 320 and the central fixed terminal 360. The central fixed terminal 360 includes the connection hole 361 in which one end of the central moving terminal 320 can be axially and displaceably provided. One end of the central fixed terminal 360 away from the connection hole 361 is for connecting to a back-end antenna signal processing module (not shown).

As shown in FIG. 6, in this embodiment, the central fixed terminal 360 further includes multiple slits 362. The slits 362 extend axially, and are provided at intervals around the connection hole 361. The axial length of the slits 362 is smaller than a half of the axial depth of the connection hole 361. In other words, the ratio of the axial length of the slits 362 of the central fixed terminal 360 to the depth of the connection hole 361 in FIG. 6 is smaller than the ratio of the axial length of the slits 362 of the central fixed terminal 360 to the depth of the connection hole 361 in FIG. 5. Given that the axial length of the slits 362 is smaller, the ratio by which the wall of the connection hole 361 expands through the slits 362 is also smaller. Correspondingly, the mechanical strength and durability of the connection hole 361 of the central fixed terminal 360 are enhanced, so as to prevent deformation and laxity of the connection hole 361 after a long period of use and thus an unstable electrical connection relationship between the central moving terminal 320 and the central fixed terminal 360.

As shown in FIG. 6, in this embodiment, the moving terminal flange 321 is formed radially at the central moving terminal 320, a fixed terminal flange 363 is formed radially at the central fixed terminal 360, the moving terminal flange 321 is axially aligned with the fixed terminal flange 363, and the inner spring 322 is provided between the moving terminal flange 321 and the fixed terminal flange 363. The elastic restoring force of the inner spring 322 is applied on the moving terminal flange 321 and forces the central moving terminal 320 to continually apply a pressure on the docking terminal. Furthermore, the moving terminal flange 321, the fixed terminal flange 363 and the inner spring 322 are all made of a conductive material. As the two end sides of the inner spring 322 respectively abut against the moving terminal flange 321 and the fixed terminal flange 363, the moving terminal flange 321, the inner spring 322, and the fixed terminal flange 363 can also form a path for transmitting signals or power, which helps reduce the internal resistance between the central moving terminal 320 and the central fixed terminal 360, enhancing the stability of the electrical connection relationship between the central moving terminal 320 and the central fixed terminal 360.

As shown in FIG. 6, in this embodiment, the outer spring 331 and the sealing member 332 are further provided between the housing 310 and the insulation body 340. The two end sides of the outer spring 331 respectively abut against the peripheral contact 330 and the sealing member 332. Furthermore, a through hole 314 for water discharging is formed at the connector stem 312, and a water guiding portion 315 is formed on the inner side of the through hole 314. In this embodiment, the through hole 314 is near the installation flange 311, the water guiding portion 315 is jointly formed by the sealing member 332 and the insulation body 340, and the sealing member 332 seals the gap between the housing 310 and the insulation body 340. When a liquid enters the water guiding portion 315 from the gap between the peripheral contact 330 and the housing 310 or between the peripheral contact 330 and the insulation body 340, the sealing member 332 prohibits the liquid from passing through. Furthermore, the through hole 314 becomes a water discharging opening of the water guiding portion 315, and the liquid flows out along the water guiding portion 315 and via the through hole 314, thereby achieving water discharging and waterproof effects.

Figure 7:
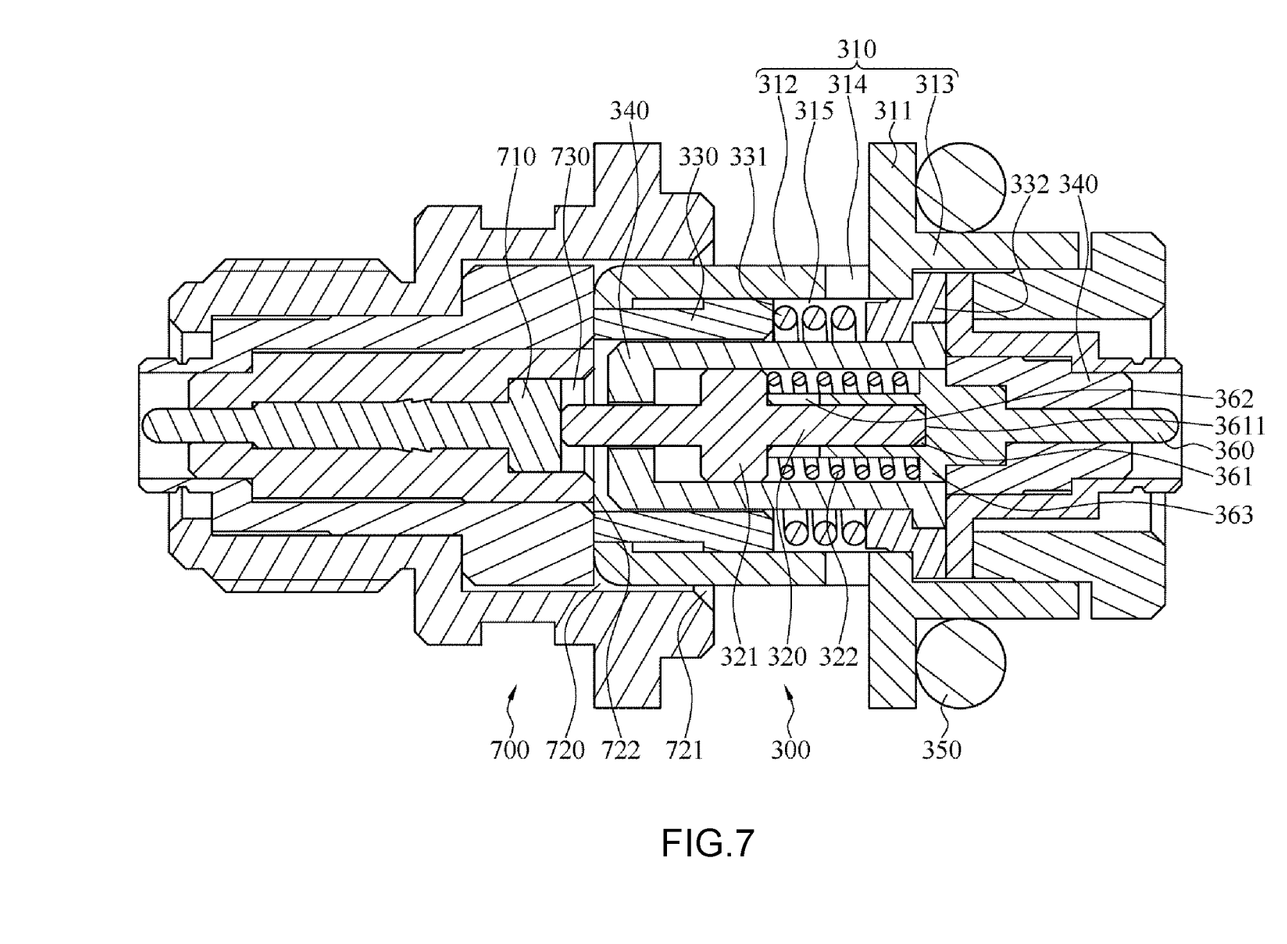
FIG. 7 is a sectional diagram of an antenna connector in FIG. 6 connected to a corresponding docking connector.

Referring to FIG. 7, FIG. 7 shows a sectional diagram of the antenna connector 300 in FIG. 6 connected to a corresponding docking connector. In this embodiment, the docking connector connected to the antenna connector 300 is, for example, the first docking connector 700 in FIG. 4. As shown in FIG. 7, the antenna connector 300 and the first docking connector 700 are already mutually butted. At this point in time, the central moving terminal 320 and the peripheral contact 330 are pressed into the housing 310 by the first docking connector 700, the central moving terminal 320 is deep in the connection hole 361 of the central fixed terminal 360, and the moving terminal flange 321 is in contact with the central fixed terminal 360. Furthermore, compared to the antenna connector 300 in FIG. 5, the depth of the connection hole 361 of the central fixed terminal 360 of the antenna connector 300 in FIG. 6 is smaller (or the axial length of the part of the central moving terminal 320 plugged into the connection hole 361 is longer). Thus, as shown in FIG. 7, when the moving terminal flange 321 comes into contact with the central fixed terminal 360, one end of the central moving terminal 320 abuts against the hole bottom 3611 of the connection hole 361. The above configuration increases the contact area between the central moving terminal 320 and the central fixed terminal 360, which helps enhance the stability of the electrical connection relationship between the central moving terminal 320 and the central fixed terminal 360.

As shown in FIG. 7, in this embodiment, when the antenna connector 300 and the first docking connector 700 are mutually butted, the elastic restoring force of the inner spring 322 is applied on the moving terminal flange 321, such that the central moving terminal 320 is forced to apply a pressure in a forward direction on the first docking terminal 710 of the first docking connector 700. The above configuration ensures that the central moving terminal 320 is in constant contact with the first docking terminal 710, which helps enhance the stability of the electrical connection relationship between the central moving terminal 320 and the first docking terminal 710.

As shown in FIG. 7, in this embodiment, the docking hole 720 of the first docking connector 700 has an opening side 721 and a bottom side 722, the bottom side 722 of the docking hole 720 is provided in a recessed manner a terminal hole 730, and the first docking terminal 710 is located in the terminal hole 730. The opening side 721 of the docking hole 720 axially inclines upwards from one end away from the bottom side 722 to the bottom side 722, such that a maximum radial width of the opening side 721 is greater than a minimum radial width of the docking hole 720, and the minimum radial width of the docking hole 720 is equal to the radial width of the connector stem 312 of the antenna connector 300. The above configuration facilitates the connection of the antenna connector 300 and the first docking connector 700. For example, during a connection process, the peripheral contact 330 and the connector stem 312 can more easily enter the docking hole 720 along the wider opening side 721 of the docking hole 720. After the peripheral contact 330 and the connector stem 312 pass through the opening side 721, the peripheral contact 330 receives the pressure of the bottom side 722 of the docking hole 720 and is gradually pressed into the connector stem 312, and the connector stem 312 at the same time is limited by the docking hole 720 and becomes axially aligned with the docking hole 720. Since the connector stem 312 is axially aligned with the docking hole 720, the central moving terminal 320 is correspondingly axially aligned with the first docking terminal 710. Furthermore, the central moving terminal 320, due to the stress provided by the inner spring 322, protrudes into the terminal hole 730, and constantly applies a forward force on the first docking terminal 710.

In conclusion, the electronic device and the antenna connector according to the embodiments of the present invention facilitate mutual positioning between a corresponding antenna connector and a first docking connector and between a signal connector and a second docking connector during the connection therebetween, as well as reinforcing connection stability. Thus, not only tolerances of components and the assembly of the components can be counterbalanced through a structural design to further eliminate the influences of tolerances, but also stress generated from vibration or swaying can be absorbed to maintain a constant connection relationship between the transmission interfaces, preventing the interruption caused by vibration or swaying.

While the technical contents of the present invention have been disclosed by way of the preferred embodiments above, it is to be understood that the present invention is not limited thereto. Modifications and variations made by a person skilled in the art without departing from the spirit of the present invention should fall within the scope of the present invention. Therefore, the protection scope of the present invention should be defined by the appended claims.

What is claimed is:

1. An antenna connector, adapted to be installed to a base, comprising:
    a housing, comprising an installation flange formed radially, the antenna connector installed to the base through the installation flange;
    a central moving terminal, axially and displaceably provided in the housing; a peripheral contact, axially and displaceably provided between the housing and the central moving terminal;
    an insulation body, provided between the central moving terminal and the peripheral contact; and
    an elastic member located exterior to the housing and below and directly contacting the installation flange, and arranged and configured such that when the antenna connector has been fully installed on the base, the elastic member is clamped between the base and the installation flange, wherein a material of the elastic member is deformable such that the antenna connection is axially displaceable when installed on the base due to flattening of the elastic member.

2. The antenna connector according to claim 1, wherein the housing comprise a connector root and a connector stem, the connector root is located on one axial end side and the connector stem is located on the other axial end side; the central moving terminal is provided on a center axis of the connector stem; the insulation body is provided between the connector stem and the central moving terminal; and a through hole for water discharging is formed at the connector stem, and a water guiding portion is formed on the inner side of the through hole.

3. The antenna connector according to claim 1, further comprising a central fixed terminal; wherein the central fixed terminal is provided in the insulation body and is axially aligned with the central moving terminal, the central fixed terminal comprises a connection hole, and one end of the central moving terminal is axially and displaceably provided in the connection hole.

4. The antenna connector according to claim 3, wherein the central fixed terminal further comprises a plurality of slits, the slits extend axially around the connection hole and are provided at intervals, and an axial length of the slits is smaller than a half of an axial depth of the connection hole.

5. The antenna connector according to claim 3, wherein a moving terminal flange is radially formed at the central moving terminal, a fixed terminal flange is radially formed at the central fixed terminal, the moving terminal flange is axially aligned with the fixed terminal flange, and an inner spring is provided between the moving terminal flange and the fixed terminal flange.

6. The antenna connector according to claim 5, wherein when the moving terminal flange comes into contact with the central fixed terminal, one end of the central moving terminal abuts against a hole bottom of the connection hole.

7. An electronic device, comprising:
    a first unit;
    a transmission dock, pivotally provided at the first unit;
    a base, movably provided at the transmission dock, the base comprising a top plate and a bottom plate, the top plate and the bottom plate mutually fixed; a4
    an antenna connector, movably provided at the base, the antenna connector comprising a housing, an installation flange, a central moving terminal and an elastic member, the central moving terminal located in the housing, the installation flange radially formed outside the housing, the installation flange located between the top plate and the bottom plate and abutting against the top plate, the elastic member clamped between the installation flange and the bottom plate; and
    a fixing member, comprising a locking portion, a neck portion and a step portion that are axially arranged, the neck portion located between the locking portion and the step portion;
    wherein the transmission dock comprises a base plate, and the base plate has a base plate limiting hole; a radial size of the neck portion is smaller than a radial size of the base plate limiting hole, and a radial size of the step portion is greater than the radial size of the base plate limiting hole; the locking portion is fixed at the bottom plate, the neck portion penetrates through the base plate limiting hole, and the base plate is clamped between the step portion and the bottom plate.

8. The electronic device according to claim 7, further comprising:
    a positioning column, fixed at the base.

9. The electronic device according to claim 7, further comprising:
    a signal connector, comprising a signal terminal, a connector platform and a frame, the signal terminal provided at the connector platform, the connector platform movably provided at the frame, the frame fixed at the base.

10. The electronic device according to claim 9, further comprising:
    a second unit, comprising a first docking connector and a second docking connector, the first docking connector comprising a first docking terminal and a docking hole, the first docking terminal located in the docking hole, the second docking connector comprising a second docking terminal and a docking platform, the second docking terminal provided at the docking platform;
    wherein the second unit is detachably connected to the transmission dock, the first docking connector is detachably connected to the antenna connector, and the second docking connector is detachably connected to the signal connector.

11. The electronic device according to claim 10, wherein the docking hole has an opening side and a bottom side, the opening side axially inclines upwards from one end away from the bottom side to the bottom side, and the first docking terminal is located at the bottom side.

12. An electronic device, comprising:
    a first unit;
    a transmission dock, pivotally provided at the first unit;
    a base, movably provided at the transmission dock, the base comprising a top plate and a bottom plate, the top plate and the bottom plate mutually fixed; and
    an antenna connector, movably provided at the base, the antenna connector comprising a housing, an installation flange, a central moving terminal and an elastic member, the central moving terminal located in the housing, the installation flange radially formed outside the housing, the installation flange located between the top plate and the bottom plate and abutting against the top plate, the elastic member clamped between the installation flange and the bottom plate;

wherein the top plate comprises a top plate limiting hole, the housing comprises a connector stem, the connector stem penetrates through the top plate limiting hole, and a radial size of the connector stem is smaller than a radial size of the top plate limiting hole.

13. The electronic device according to claim 12, wherein the bottom plate has a bottom plate limiting hole, and the bottom plate limiting hole is axially aligned with the top plate limiting hole; the housing further comprises a connector root, the connector root extends into the bottom plate limiting hole, and a radial size of the connector root is smaller than a radial size of the bottom plate limiting hole.

14. The electronic device according to claim 13, wherein the installation flange is located between the connector stem and the connector root, and surrounds the housing.

15. The electronic device according to claim 12, wherein the bottom plate further comprises a protruding column, the protruding column is provided in a protruding manner at the bottom plate and is located between the top plate and the bottom plate, the bottom plate limiting hole is located in the protruding column, and the elastic member is clamped between the installation flange and the protruding column.

16. The electronic device according to claim 14, wherein the elastic member surrounds and is in contact with the connector root.

* * * * *